United States Patent [19]

Lentz et al.

[11] 4,022,988
[45] May 10, 1977

[54] FAULT LOCATING APPARATUS FOR DIGITAL TRANSMISSION SYSTEM

[75] Inventors: George Howard Lentz, Andover; Richard Palmer Slade, North Andover, both of Mass.

[73] Assignee: Bell Telephone Laboratories, Incorporated, Murray Hill, N.J.

[22] Filed: June 14, 1976

[21] Appl. No.: 695,522

[52] U.S. Cl. ............... 179/175.31 R; 340/146.1 E
[51] Int. Cl.² ................................... H04B 1/60
[58] Field of Search ......... 179/175.31 R, 175.3 R, 179/175.3 F, 15 BF; 178/69 A; 340/146.1 E

[56] References Cited
UNITED STATES PATENTS

| | | | |
|---|---|---|---|
| 3,678,222 | 7/1972 | Boehly | 179/175.31 R |
| 3,866,217 | 2/1975 | Bennett | 340/146.1 E |
| 3,872,257 | 3/1975 | Bleickardt et al. | 179/15 BS |

Primary Examiner—Douglas W. Olms
Attorney, Agent, or Firm—Bryan W. Sheffield

[57] ABSTRACT

Defective repeaters in a multihop, digital microwave transmission system are located by the use of a special test pattern which is generated at the transmitting terminal. At each repeater station, the two outputs of the phase demodulator are compared to determine if the test pattern has been properly received from the upstream repeaters. The special test pattern, $S$, has the characteristic that $S = \overline{S(2N)}$; that is to say, the test pattern equals the complement of itself delayed by $2N$ symbols. This special characteristic makes it unnecessary to employ a differential decoder in the test apparatus at each repeater station.

4 Claims, 4 Drawing Figures

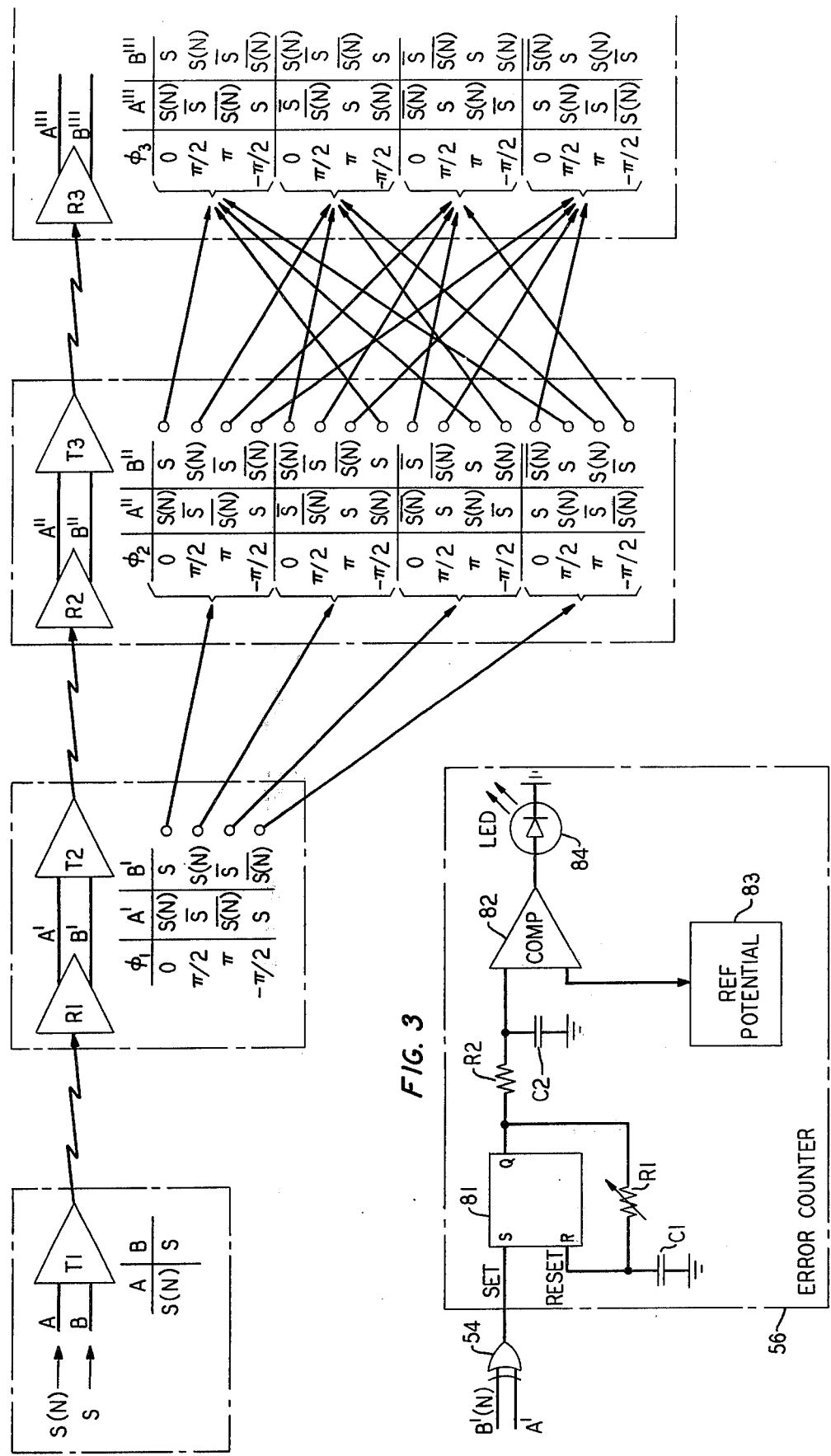

FAULT LOCATING APPARATUS FOR DIGITAL TRANSMISSION SYSTEM

BACKGROUND OF THE INVENTION

A. Field of the Invention

Broadly speaking, this invention relates to digital transmission systems. More particularly, in a preferred embodiment, this invention relates to methods and apparatus for locating defective repeaters in digital transmission systems of the type that employ four-phase, differentially-encoded, phase-shift keying.

B. Discussion of the Prior Art

The use of high-speed, digital transmission systems is becoming increasingly widespread. Such systems may be used to transmit both pure binary data and digitally encoded analog signals. The transmission medium employed may comprise optical fiber, coaxial cable, millimeter waveguide or microwave radio, the latter being the most widely employed due to its lower initial cost.

A typical digital microwave system will comprise a terminal station at both ends of the system and a plurality of intermediate repeater stations spaced from 1.5 to 25 miles apart, depending upon the transmitting frequencies employed and the nature of the intervening terrain.

Because of the large number of repeaters employed in a typical microwave route and the fact that most of these repeaters are unattended, it becomes important to be able to quickly determine which of the repeaters has become defective if the receiving terminal determines that it is receiving the data signals with an unacceptably high error rate.

One known way to do this is to devise a unique test pattern and to transmit this pattern for comparison within each repeater with a locally stored version of the unique test pattern. If the digital transmission system is of a type that differentially encodes the digital signal prior to transmission, as most do, this prior art testing procedure requires a differential decoder in each repeater, in addition to a parallel-to-serial converter and some suitable means for storing the unique test pattern. Since a differential decoder is not ordinarily required at an intermediate repeater station, this is obviously an expensive solution to the problem. Known variations of this testing procedure eliminate the need for the parallel-to-serial converter and the memory storage means, but the expensive differential decoder is still necessary.

SUMMARY OF THE INVENTION

The problem, then, is to devise a testing technique which can quickly determine which of a plurality of repeaters in a digital transmission system is responsible for excessive system errors, without requiring expensive testing apparatus at each repeater station.

Fortunately, the above and other problems have been solved by the instant invention, which, in a peferred embodiment comprises apparatus for locating faults in a digital transmission system of the type that includes a transmitting terminal, a receiving terminal and at least one intermediate repeater station. More particularly, the transmitting terminal includes a serial-to-parallel converter having an input connected to the incoming bitstream for generating on first and second rails two output bitstreams, at half the rate of the incoming bitstream; a differential encoder connected to the serial-to-parallel converter for differentially encoding the bitstreams on the first and second rails; a sinusoidal oscillator; and a four-phase, phase-shift modulator connected to both of the output rails from the differential encoder for modulating the output of the sinusoidal oscillator. This apparatus is characterized in that the transmitting terminal further comprises means for generating a fixed test pattern, S, having the property that $$\overline{s(2N)} = S$$

where $$N \geq 1,$$

the test pattern having a length $L = 4N$ and being applied to both input rails of the phase-shift modulator; and means, interposed between the pattern generating means and one of said rails, for delaying the test pattern by $N$ symbols.

The above invention and its mode of operation will be more fully understood from the following detailed description, when taken with the appended drawings in which:

DESCRIPTION OF THE DRAWINGS

FIG. 3 is a block schematic diagram of an illustrative error counter which is suitable for use in the fault locating apparatus shown in FIG. 2; and FIG. 4 is a schematic diagram of the first three hops in a multihop digital transmission system showing the various signal phase combinations to be found therein.

DETAILED DESCRIPTION OF THE INVENTION

Figure 1:
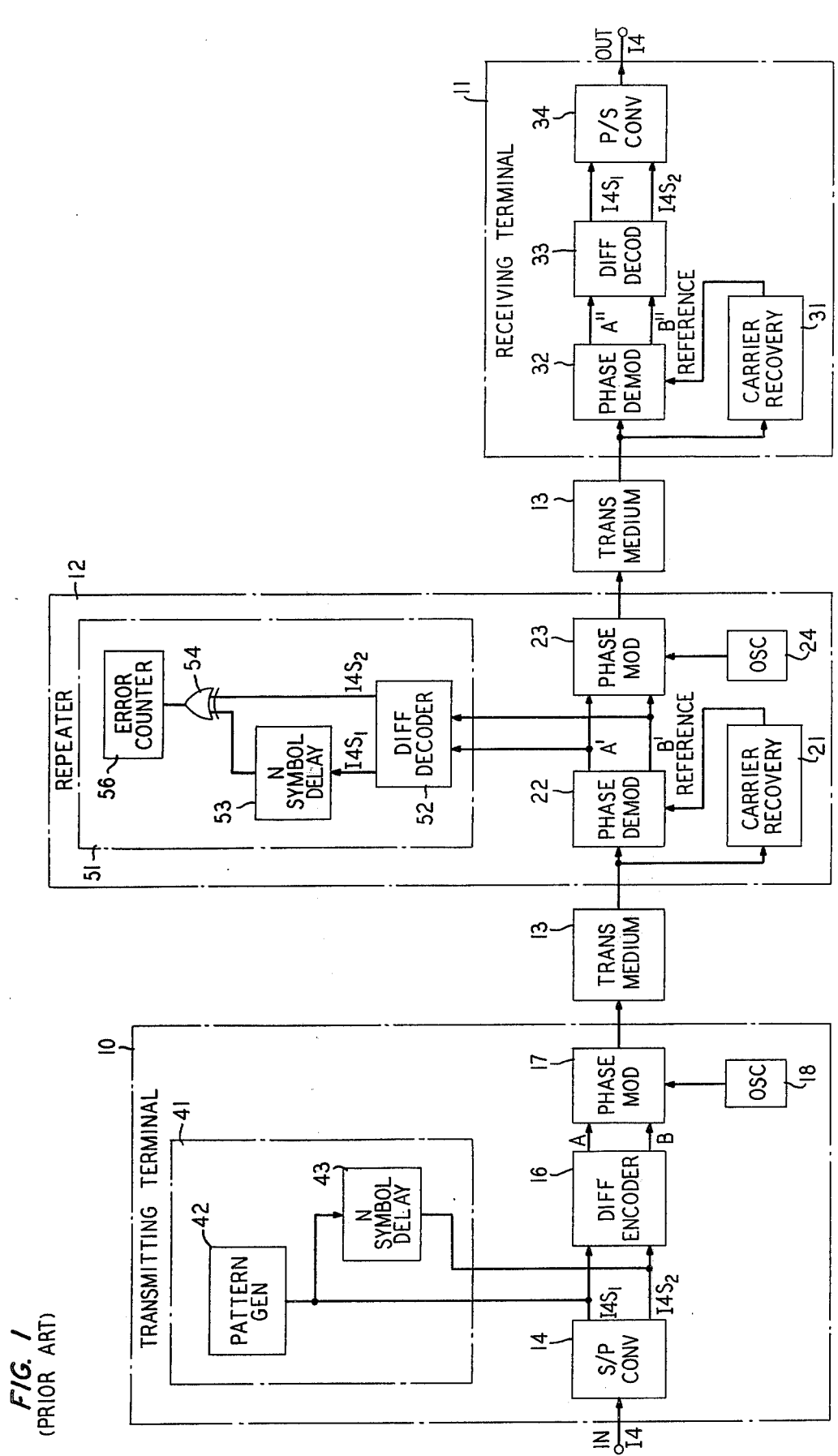
FIG. 1 is a block schematic diagram of an illustrative multi-repeater digital transmission system together with a known, prior-art fault locating arrangement.

FIG. 1 depicts a typical, multi-repeater, digital transmission system of a type that employs four-phase, differentially-encoded, phase-shift keying (DCPSK), for example the microwave radio system known to the industry as DR 18A; a high capacity, solid-state, short-haul system which operates in the 18 GHz common carrier band and derives eight, two-way radio channels, each of which accepts a DS4-level digital signal at 274 Mb/sec. and carries, in digital form, the equivalent of 4,032 voiceband telephone circuits. A detailed discussion of the Bell System digital hierarchy, and the format of the DS4-bitstream, in particular, is not necessary to a complete understanding of the instant invention; however, such a discussion may be found in the commonly assigned U.S. Pat. No. 3,872,257, dated Mar. 18, 1975 to W. H. Bleickardt and R. B. Robrock II, which is hereby incorporated by reference. One skilled in the art will readily appreciate that the instant invention is not limited to the DR 18A system nor, indeed, to microwave radio. The invention may be successfully utilized in any digital transmission system employing four-phase, DCPSK modulation, for example, systems which are transmitted over coaxial cable, millimeter waveguide optical fibers, or even conventional insulated cable.

To simplify the drawings, only one direction of transmission is shown. It will be understood that the other direction of transmission is identical and, thus, need not be discussed in detail. Further, while only one intermediate repeater station is shown in the drawing, a typical system will comprise many such intermediate repeater stations.

As shown in FIG. 1, the illustrative system includes a transmitting terminal 10, a receiving terminal 11 and one intermediate repeater station 12. Some suitable transmission medium 13, for example, the above-mentioned DR 18A microwave system, links the transmitting and receiving terminals through the intermediate repeater station. Because the transmission system, per se, forms no part of this invention, the microwave oscillators, amplifiers, demodulators, etc., conventionally included in such a transmission system are not shown in the drawings. The same is true of such conventional circuit elements as power supplies, clock circuits, etc.

Transmitting terminal 10 includes a serial-to-parallel converter 14 which receives the incoming digital signal at the 274 Mb/sec. I4 rate and splits it into two rails, I4S$_1$ and I4S$_2$, each operating at half the rate of the incoming I4 signal. The two rails from converter 14 are connected to a differential encoder 16, for example the encoder shown in commonly assigned U.S. Pat. Nos. 3,128,342 and 3,128,343 which issued Apr. 7, 1964 to P. A. Baker and which are hereby incorporated by reference. Encoder 16, in turn, is connected to a phase-modulator 17 which modulates the output of a sinusoidal oscillator 18.

Intermediate repeater station 12 includes a carrier recovery circuit 21 which reconstructs a reference carrier from the incoming digital signal. The recovered carrier is supplied to a phase-demodulator 22 which demodulates the incoming signal from the transmission medium. Demodulator 22, in turn, is connected to a second, phase-modulator 23 which modulates the output of a sinusoidal oscillator 24.

In the receiving terminal, a second carrier recovery circuit 31 reconstructs the reference carrier from the incoming digital signal and supplies it to a second phase-demodulator 32 which, in turn, is connected to a differential decoder 33. Decoder 33 derives from the incoming signal the two original digital rails, I4S$_1$ and I4S$_2$, which are then interleaved in a parallel-to-serial converter 34 to form I4, the original single rail signal.

As is well known, in a four-phase, DCPSK system the reference carrier which is used for demodulation is reconstructed from the received signal at each repeater. Since the received signal can have any one of four possible phases, 90° each apart, the reconstructed carrier can also have any one of the same phases. Because of this 90° phase ambiguity, the DCPSK modulation scheme converts the input digital information into 0°, 90°, 180° and 270° phase changes, rather than into absolute phases. In the illustrative embodiment shown in FIG. 1, the incoming digital input signal at the I4 rate is split into two rails, I4S$_1$ and I4S$_2$, at half the incoming rate. These two rails are then differentially encoded an applied to a phase modulator. The possible phase states of the modulator are shown in Table A below.

TABLE A

| INPUT | | OUTPUT |
| A | B | PHASE |
|---|---|---|
| 0 | 0 | 0 |
| 0 | 1 | $\pi/2$ |
| 1 | 0 | $-\pi/2$ |
| 1 | 1 | $\pi$ |

In the intermediate repeater, the incoming signal is demodulated using the reference carrier which is extracted from the incoming digital signal by the carrier recovery circuit. There are four possible outputs from the demodulator, depending upon the phase state of the reference carrier. These outputs are shown in Table B, below:

TABLE B

| A' | B' | REFERENCE PHASE |
|---|---|---|
| A | B | 0 |
| $\overline{B}$ | A | $\pi/2$ |
| $\overline{A}$ | $\overline{B}$ | $\pi$ |
| B | $\overline{A}$ | $-\pi/2$ |

In the intermediate repeater stations there is obviously no need to differentially decode the demodulator output back to the original input signal; thus, the output of the demodulator is fed directly into the input of the phase modulator. At the receiving terminal, however, it is necessary to differentially decode the output of the demodulator in order to recover the I4S$_1$ and I4S$_2$ rails which are ultimately recombined in the parallel-to-serial converter to yield the desired I4 output signal.

The most straightforward method of locating faults in a DCPSK system such as shown in FIG. 1, is to apply a known I4 level test pattern to the system input at the transmitting terminal. Then at each repeater station, the A' and B' outputs of the demodulator are differentially decoded and interleaved into a single rail by means of a parallel-to-serial converter. This signal is then checked for errors by comparing it with a replica of the transmitted test pattern which is stored for that purpose at each repeater. Obviously, this approach requires a differential decoder and a parallel-to-serial converter at each repeater station as well as some means for storing the unique test pattern. This is an expensive and hence unattractive solution to the problem.

A variation of the above method, which does not require a parallel-to-serial converter and/or stored test pattern at each repeater, is superimposed on the basic system shown in FIG. 1. The additional equipment at the transmitting terminal, designated by reference numeral 41, comprises a pattern generator 42 connected directly to the I4S$_1$ and I4S$_2$ inputs to differential encoder 16. A delay circuit 43 delays by N bit-intervals the pattern which is applied to the I4S$_2$ input of encoder 16. This N-symbol delay is used to reduce the correlation between the input signals.

The test circuitry at each repeater station, designated by reference numeral 51, includes a differential decoder 52 connected to the output of phase-demodulator 22 to retrieve the I4S$_1$ and I4S$_2$ signals from the demodulator output. A second delay circuit 53 delays the I4S$_1$ signal by N bit-intervals and the instantaneous and delayed digital signals are then compared in an exclusive OR-gate 54. When the two signals disagree, a pulse is produced by OR-gate 54 which is counted by an error counter 56 connected to the output of the OR-gate. If the system is error-free, the two signals will be identical and there will be no output from OR-gate 54. On the other hand, if there are any errors in repeater 12 (or any other repeaters upstream from repeater 12), then the two signals compared by OR-gate 54 will differ and error pulses will be counted by counter 56.

Although an improvement over the previously discussed error detection system, the arrangement shown in FIG. 1 still requires a differential decoder at each repeater station which makes it an expensive arrangement. The modification of FIG. 1 shown in FIG. 2, however, eliminates the need for a differential decoder in each intermediate repeater. As shown, the test equipment 61 according to this invention comprises a pattern generator 62 which generates a fixed test pattern which is applied in place of the A and B outputs of differential encoder 16, rather than to the I4S$_1$ and I4S$_2$ inputs to the differential encoder. Again, a delay unit 43 delays the A input by N bit-intervals. Within repeater 12, the error detection circuit 71 now merely comprises a delay circuit 53, an exclusive OR-gate 54, and an error counter 56 connected to the A' and B' outputs of demodulator 22, as before. Note that in the improved circuit the differential decoder 52 is no longer needed.

In circuit 71 the B' output from demodulator 22 is delayed by N bit-intervals, henceforth designated B'(N), and compared in OR-gate 54 with the undelayed A' output from demodulator 22. Clearly, the outputs B'(N) and A' are not necessarily equal because the reference carrier can have any one of four possible phases. Table C, below, shows for each of these four possible phases the signals present at the input to OR-gate 54:

TABLE C

| REFERENCE PHASE | A' | B'(N) |
|---|---|---|
| 0 | A | B(N) |
| $\pi/2$ | B | $\overline{A(N)}$ |
| $\pi$ | $\overline{A}$ | $\overline{B(N)}$ |
| $-\pi/2$ | $\overline{B}$ | A(N) |

If the input test pattern is denominated S, Table D shows the corresponding input to OR-gate 54 in terms of the test pattern S:

TABLE D

| REFERENCE PHASE | A' | B'(N) | |
|---|---|---|---|
| 0 | S(N) | S(N) | (Identical) |
| $\pi/2$ | $\overline{S}$ | S(2N) | |
| $\pi$ | $\overline{S(N)}$ | $\overline{S(N)}$ | (Identical) |
| $-\pi/2$ | S | $\overline{S(2N)}$ | | where B'(2N) denotes B' delayed by twice N baud intervals, and $\overline{B'}$ denotes B' inverted, etc.

It will be observed from Table D that with test pattern S A' is not necessarily equal to B'(N). However, it has been discovered that certain special test patterns can be generated which will make A' equal to B'(N) under all reference phase conditions. The output of exclusive OR-circuit 54 will under these circumstances become 1 only in the event of system errors. The special characteristic of these test patterns is:

$$\overline{S(2N)} = S. \quad (1)$$

This equation implies that for the above-described special effects to occur, the test pattern must be equal to the complement of itself delayed by 2N symbols. This, in turn, dictates that the pattern length by 4N symbols.

Let us now consider a specific example where $$N = 3$$
$$L = 12$$

One possible pattern meeting the requirements of equation (1) is $$s = 1\ 1\ 1\ 0\ 0\ 1\ 0\ 0\ 0\ 1\ 1\ 0\ ...$$
thus
$$S(3) = 1\ 0\ 0\ 1\ 0\ 0\ 0\ 1\ 1\ 0\ 1\ 1\ ...$$

Special test patterns generated according to equation (1) make the fault locating method disclosed herein independent of the reference carrier phase while at the same time eliminating the need for a differential decoder, parallel-to-serial converter and/or stored patterns in each repeater.

With the specific test pattern applied to the system by generator 62, the error counter at each repeater will give the number of errors introduced by the system up to and including that repeater. It is, thus, a relatively easy matter to backtrack and determine which of the repeaters in a system is the source of observed error.

FIG. 3 depicts a circuit which may be used to indicate when the special test pattern is being received with an acceptable error rate. As shown, this circuit comprises a monostable multivibrator 81 and a comparator circuit 82 connected to a source of a reference potential 83 and some suitable indicating device 84, for example a light-emitting diode. The output of multivibrator 81 goes high when the multivibrator is set by an error pulse from OR-gate 54. The output of multivibrator 81 will remain high until reset by the feedback circuit comprising resistor R1 and capacitor C1. R1 and C1 also dictate the pulse-width of the output signal from monostable multivibrator 81. Once set by an error pulse, multivibrator 81 cannot be set again until first reset. When the arrival time of the error pulses approximates the time-constant of the multivibrator, the output will be high. If there are no error pulses, the output will always be low. When the arrival time of the error pulses is equal to twice the time constant of the multivibrator, the output thereof will be a symmetrical square wave which, after filtering in R2 and C2, yields a d.c. voltage which is midway between the high and low voltage outputs of the multivibrator. The d.c. output from the filter comprising R2 and C2, which is related to the rate of arrival of error pulses (i.e., the error rate), is then compared in comparator 82 with a reference voltage from source 83 which is adjusted to be midway between the high and low voltages of the multivibrator output. The output of comparator 82 can be used to drive either indicating circuit 84 or some suitable remote monitoring system. The time constant of the multivibrator is set to a value which results in a square wave from the multivibrator and a filter output which is equal to the reference voltage applied to the comparator when the error rate is equal to a preselected threshold. For error rates which are greater than the threshold, the output of comparator 82 will be low, turning indicator 84 off, and thus indicating an unacceptably high error rate. Correspondingly, when the error rate is below the threshold, the output from comparator 82 will be high causing indicator 84 to light, which indicates an acceptable error rate.

During normal operating conditions, i.e., when the system is carrying ordinary message traffic and pattern generator 62 is disabled, the signals A' and B' (N) will differ from each other 50 percent of the time, on the average, causing comparator 82 to indicate that the pattern is not being received with an acceptable error rate. When fault locating on the system, the normal message load is replaced with the special test pattern at the near-end terminal. Each repeater will then indicate whether or not the special test pattern is being received with an acceptable error rate.

By using a test pattern which does not satisfy the special equation $\overline{S(2N)} = S$, but in which $B = S(N)$ and $A = S$, it is also possible to identify and isolate repeaters which are creating carrier reference cycle skips. FIG. 4 is a block diagram of the first three hops of an illustrative multihop system. The first hop comprises transmitter T1 and receiver R1; the second hop comprises transmitter T2 and receiver R2; and the third hop comprises transmitter T3 and receiver R3. A and B respectively represent the inputs to the phase-modulator of transmitter T1; A' and B' the inputs to the phase-modulator of transmitter T2; A'' B'' the inputs to the phase-modulator of transmitter T3; and A''' B''' the outputs of the demodulator of receiver R3 (which in general will be connected to yet another phase-modulator). The tables shown under each receiver indicate the possible receiver outputs for the various carrier reference phases $\phi_i$. The output from any other receiver is dependent upon its carrier reference phase, as well as the carrier reference phases of the preceding receivers. A receiver will indicate a correct receiver output when $$\begin{pmatrix} A' \\ B' \end{pmatrix} = \begin{pmatrix} S(N) \\ S \end{pmatrix} \text{ or } \begin{pmatrix} \overline{S(N)} \\ S \end{pmatrix}.$$

As an example, assume that the receiver phases R1, R2 and R3 are respectively, $\pi$ $\pi/2$, and $-\pi/2$. In this case, receivers R1 and R3 will indicate a good pattern, whereas R2 will not indicate a good pattern. If R2 is defective, for example, in such a way that the receiver skips phase from $\pi/2$ to $\pi$, R2 will now show a good test pattern and R3 will not show a good test pattern. Using this information, the fault can quickly be isolated to R2. This method can be extended to faults in other receivers and to other combinations of receiver phases. In this technique, the pattern length L is not restricted to 4N but may be arbitrarily long.

In summary, a technique is disclosed for fault location in a multihop, digital transmission system which takes advantage of the special properties of four-phase, DCPSK modulation wile eliminating the need to provide a differential decoder, a parallel-to-serial converter and/or a stored test pattern in each repeater.

One skilled in the art can make various changes and substitutions to the layout of parts shown without departing from the spirit and scope of the invention.

What is claimed is:

1. Apparatus for locating faults in a digital transmission system of the type that includes a transmitting terminal, a receiving terminal, and at least one intermediate repeater station, said transmitting terminal including:
   a serial-to-parallel converter having an input connected to the incoming bitstream for generating on first and second rails two output bitstreams for generating on first and second rails two output bitstreams at half the rate of the incoming bitstream;
   a differential encoder connected to said serial-to-parallel converter for differentially encoding the bitstreams on said first and second rails;
   a sinusoidal oscillator; and
   a four-phase, phase-shift modulator connected to both output rails from said differential decoder for modulating the output of said sinusoidal oscillator, characterized in that said transmitting terminal further comprises:
   means for generating a fixed test pattern, S, having the property that $$\overline{S(2N)} = S$$

where
   $N \geq 1$, said test pattern having a length $L = 4N$ and being applied to both input rails of said phase-shift modulator; and
   means, interposed between said pattern generating means and one of said rails, for delaying said test pattern by N symbols.

2. The apparatus according to claim 1 wherein $N$ 3, $L = 12$, and $$S = 1 1 1 0 0 1 0 0 0 1 1 0 \ldots$$

3. The apparatus according to claim 1 wherein said at least one repeater station comprises:
   means for recovering a reference carrier from the incoming data bitstream;
   a four-phase, phase-shift demodulator connected to the incoming bitstream and to said carrier recovery means for deriving on two rails from the incoming data bitstream the two differentially encoded bitstreams priorly modulated onto the carriers at said transmitting location;
   a sinusoidal oscillator; and
   a four-phase, phase-shift modulator connected to both of the rails from said four-phase demodulator characterized in that said repeater station further comprises:
   means for comparing the bitstreams present on the two output rails from said four-phase demodulator and for generating an error signal if there is a disagreement therebetween;
   means for counting the error signals generated by said comparing means; and
   means, interposed between said comparing means and said counting means for delaying by N symbols one of the two recovered bitstreams which may not necessarily be the one which was priorly delayed by the delaying means located at said transmitting terminal.

4. The apparatus according to claim 3 wherein said comparing means comprises an exclusive OR-gate and said error counting means comprises:
   a monostable multivibrator having an output, an input connected to the otput of said exclusive OR-gate, and a reset input connected to the output of the multivibrator through an RC feedback network;
   a source of a reference potential; and
   a comparator circuit for comparing the filtered output of said multivibrator with said reference potential.

* * * * *

UNITED STATES PATENT AND TRADEMARK OFFICE
CERTIFICATE OF CORRECTION

PATENT NO. : 4,022,988
DATED : May 10, 1977
INVENTOR(S) : George H. Lentz and Richard P. Slade It is certified that error appears in the above-identified patent and that said Letters Patent are hereby corrected as shown below:

In the Abstract, line 8, "S(2N)" should read $--\overline{S(2N)}--$. Column 3, line 55, "an" should read --and--. Column 5, line 61, "1" should be enclosed in quotation marks thusly --"1"--. Column 6, line 1, "by" should read --be--; line 12, change "100100011011" to --001000110111--. Column 7, line 39, after "phases" add --for--; line 54, "wile" should read --while--; line 67, claim 1, delete "for"; line 68, delete entire line. Column 8, line 1, claim 1, delete "bitstreams"; line 25, claim 2, "N3" should read --N. = 3--; line 60, claim 4, "otput" should read --output--.

Signed and Sealed this

Third Day of July 1979

[SEAL]

Attest:

LUTRELLE F. PARKER
Attesting Officer    Acting Commissioner of Patents and Trademarks

UNITED STATES PATENT AND TRADEMARK OFFICE
CERTIFICATE OF CORRECTION

PATENT NO. : 4,022,988

DATED : May 10, 1977

INVENTOR(S) : George H. Lentz and Richard P. Slade

Figure 2:
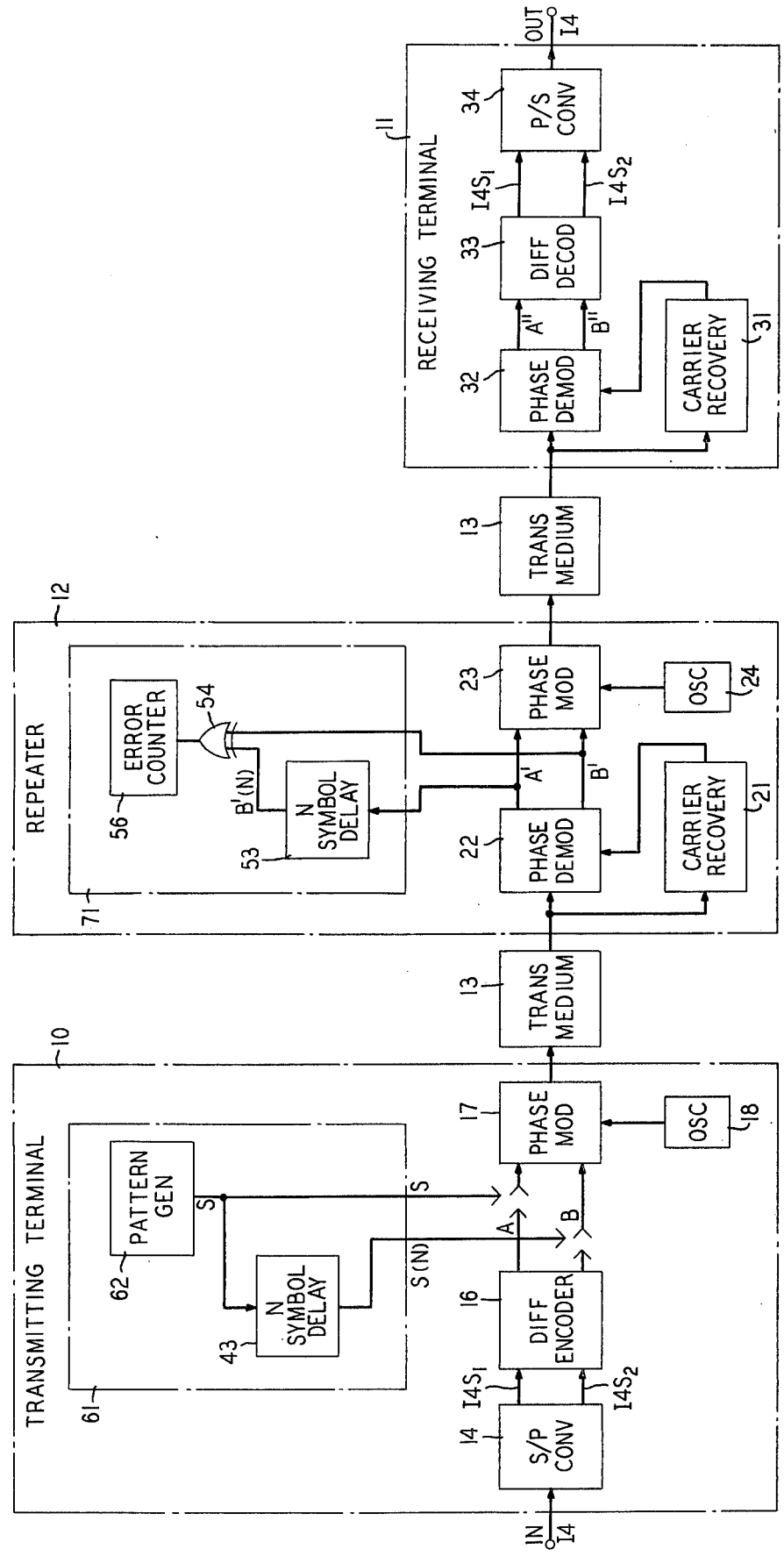
FIG. 2 is a block schematic diagram of the transmission system shown in FIG. 1 together with a fault locating arrangement according to the present invention.

It is certified that error appears in the above-identified patent and that said Letters Patent are hereby corrected as shown below:

Figure 2 of the drawings should read as follows:

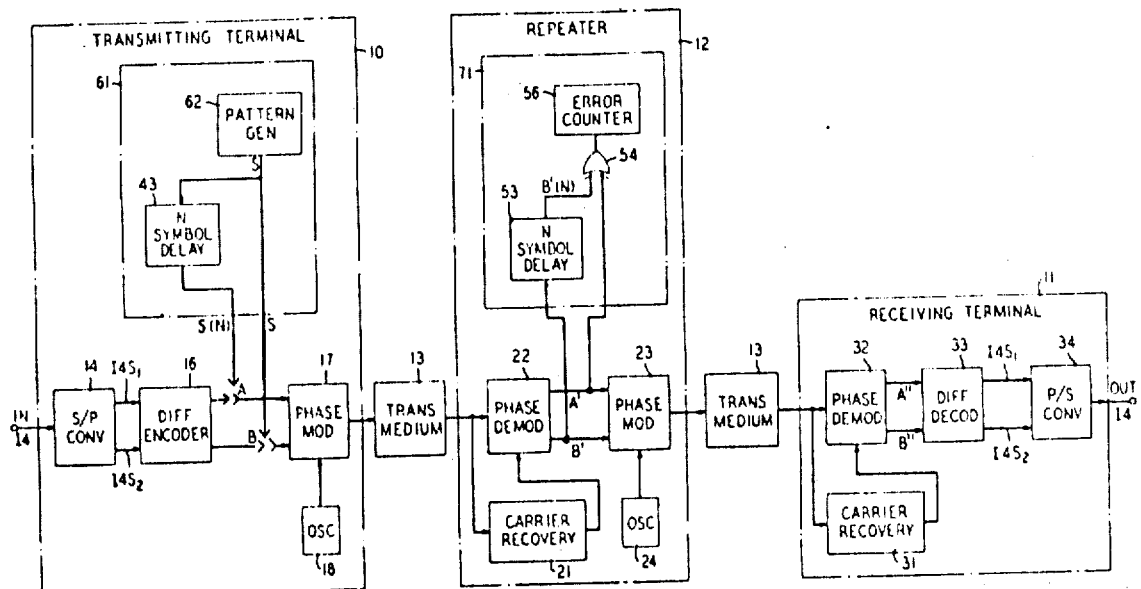

FIG. 2